(12) United States Patent
Brugger et al.

(10) Patent No.: US 10,599,243 B2
(45) Date of Patent: Mar. 24, 2020

(54) SYSTEMS AND DEVICES FOR PROVIDING RELATED CONTENT BETWEEN DEVICES

(71) Applicant: Apple Inc., Cupertino, CA (US)

(72) Inventors: Alice Marlin Brugger, San Francisco, CA (US); Tracey Adam Finger, Miami Beach, FL (US); Daniel Satoru Hamaguchi, San Mateo, CA (US); Yang Liu, Cupertino, CA (US); Steven Charles Michalske, Sunnyvale, CA (US); Israel Pastrana Vicente, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/131,685

(22) Filed: Sep. 14, 2018

(65) Prior Publication Data

US 2019/0087043 A1  Mar. 21, 2019

Related U.S. Application Data

(63) Continuation of application No. 15/137,869, filed on Apr. 25, 2016, now Pat. No. 10,078,387.

(51) Int. Cl.
| | | |
|---|---|---|
| *G06F 3/041* | (2006.01) | |
| *A47F 11/06* | (2006.01) | |
| *A47B 21/007* | (2006.01) | |
| *A47F 7/02* | (2006.01) | |
| *G06Q 30/06* | (2012.01) | |

(52) U.S. Cl.
CPC ............ *G06F 3/0412* (2013.01); *A47F 11/06* (2013.01); *A47B 2021/0076* (2013.01); *A47F 7/02* (2013.01); *G06F 2203/04106* (2013.01); *G06F 2203/04107* (2013.01); *G06Q 30/0601* (2013.01)

(58) Field of Classification Search
CPC ......... G06F 3/0412; G06F 2203/04106; G06F 2203/04107; G06F 3/041; A47F 11/06; A47F 7/02; G06Q 30/0601; G06Q 30/06; A47B 2021/0076; A47B 21/007
See application file for complete search history.

(56) References Cited

U.S. PATENT DOCUMENTS

| | | | |
|---|---|---|---|
| 2008/0122796 A1 | 5/2008 | Jobs et al. | |
| 2008/0165158 A1 | 7/2008 | Hotelling et al. | |
| 2010/0045621 A1* | 2/2010 | Kang | .................... G06F 1/1626 345/173 |

(Continued)

*Primary Examiner* — Vinh T Lam
(74) *Attorney, Agent, or Firm* — Sterne, Kessler, Goldstein & Fox P.L.L.C (57) ABSTRACT

A system for presenting an electronic device on a display table is disclosed. The system includes a table, a processor, an electronic device, and a cable. The table includes a display screen, and the display screen is operably connected to the processor. The electronic device is disposed on the table and includes a touch screen. The cable connects the electronic device to the processor. The touch screen of the electronic device is configured to display an image that changes in response to an input to the touch screen. The display screen of the table is configured to display an image that changes in response to the input to the touch screen of the electronic device. A change in the display screen image comprises a graphical continuation of a change in the touch screen image.

20 Claims, 12 Drawing Sheets

(56) References Cited

U.S. PATENT DOCUMENTS

| | | |
|---|---|---|
| 2010/0048288 A1 | 2/2010 | Canterbury et al. |
| 2010/0230917 A1 | 9/2010 | Lambert |
| 2012/0084698 A1* | 4/2012 | Sirpal .................. G06F 1/1616 715/773 |
| 2012/0162351 A1 | 6/2012 | Feldman et al. |
| 2013/0120291 A1* | 5/2013 | Baentsch .............. G06F 3/0416 345/173 |
| 2013/0244784 A1 | 9/2013 | Assa |
| 2015/0277735 A1 | 10/2015 | Gibson |
| 2016/0085362 A1* | 3/2016 | Minami ................ G06F 3/0488 345/174 |
| 2017/0068447 A1* | 3/2017 | Hong .................. G06F 3/04817 |

* cited by examiner

SYSTEMS AND DEVICES FOR PROVIDING RELATED CONTENT BETWEEN DEVICES

CROSS-REFERENCE TO RELATED APPLICATION(S)

This application is a continuation of U.S. Nonprovisional application Ser. No. 15/137,869, filed on Apr. 25, 2016, which is incorporated herein in its entirety by reference thereto.

FIELD

The described embodiments relate generally to a display table and specifically to a display table that interacts with devices presented thereon.

BACKGROUND

Display tables may be used, for example, in a retail setting to present products to consumers and to showcase features of those products.

SUMMARY

The present disclosure details systems, apparatuses, and methods related to display tables that interact with devices presented thereon. A system for presenting an electronic device on a display table may include a table including a display screen, a processor operably connected to the display screen, an electronic device including a touch screen on the table, and a cable that connects the electronic device to the processor. The touch screen of the electronic device may display an image that changes in response to an input to the touch screen. The display screen of the table may display an image that changes in response to the input to the touch screen of the electronic device. A change in the display screen image may include a graphical continuation of a change in the touch screen image.

In some embodiments, the change in the touch screen image is different based on a characteristic of the input. In some embodiments, the characteristic is a force of the input, a frequency of the input, a location of the input, a size of the input, a direction of the input, or any combination of these characteristics of the input.

In some embodiments, the system also includes a circuit board on a back side of the electronic device and a flexible cable having a first end connected to the electronic device and a second end connected to the circuit board. The cable that connects the electronic device to the processor may do so by connecting the circuit board to the processor.

In some embodiments, the system also includes a second electronic device including a touch screen on the table and a second cable that connects the second electronic device to the processor. The touch screen of the second electronic device may display an image that changes in response to an input to the touch screen of the second electronic device.

In some embodiments, the display screen image changes in response to the input to the first electronic device and the input to the second electronic device. In some embodiments, the cable is transparent. In some embodiments, the touch screen image and the display screen image are both images of water. In some embodiments, the input creates a visual effect of a moving graphical element in the touch screen image. In some embodiments, the moving graphical element appears to continue from the touch screen image onto the display screen image. In some embodiments, the moving graphical element depicts ripples (e.g., ripples in water). In some embodiments, the touch screen image is an image of an object. In some embodiments, the input causes the image of the object to move.

In some embodiments, a display table may include a display screen disposed horizontally, a support structure vertically supporting the display screen, a transparent cover overlaying the display screen and forming a top surface of the table, an electronic device disposed on the transparent cover, and a cable that operably connects the electronic device and the display screen. The transparent cover may define a hole therethrough and may be configured to support the electronic device at a location of the hole. The hole may provide a conduit for the cable.

In some embodiments, the cable is transparent. In some embodiments, the cable passes over the top of the display screen without blocking an image displayed on the display screen. In some embodiments, the transparent cover defines eight holes. In some embodiments, the display table also includes a processor configured to control the display screen.

In some embodiments, the support structure may include an outer frame, a plurality of ribs disposed within the outer frame, a pair of rails supported by the ribs configured to extend from a first length to a second length, and a display cart disposed on the pair of rails. The display screen may be disposed on the display cart.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

Retailers may use display tables to present products to consumers. In addition, display tables may be used to provide an opportunity for the consumer to interact with a product more intimately than when a product is less accessible (e.g., in a box on a shelf). Thus, the retailer can showcase features of a product, such as electronic devices, presented on a display table. It is desirable to provide a display table that interacts with electronic devices to better facilitate showcasing features of the presented electronic devices.

The following disclosure relates to a display table for presenting products. Display tables according to some embodiments of the present invention may be used in any kind of retail store. For example, display tables may be configured for, but not limited to, an electronics store. Moreover, display tables are not limited to retail stores and may be used in other settings and locations. For example, display tables may be used in an interactive museum or other setting in which items and content are to be displayed thereon.

In some embodiments, a display table includes a display screen. Electronic devices presented on the table may include a touch screen and may be operably connected to the display screen of the table. Thus, an image on the touch screen and an image on the display screen may be associated. More specifically, the image on the touch screen may be the image that would be showing on the display screen at the location of the electronic device if the electronic device was not disposed on the table at that location. Put differently, the image on the touch screen is a continuation of the image on the display screen surrounding it. The display screen thus acts as an extension of the touch screen, which may better facilitate showcasing features of the electronic device or other content.

In some embodiments, the images on the display screen and the touch screen may change in response to an input on the touch screen, such as a user's finger contacting the touch screen. For example, a change in the display screen image may include a graphical continuation of a change in the touch screen image, so that the effect of the input on the touch screen appears to continue onto the display screen surrounding it. A graphical continuation may be an image that extends visually uninterrupted between the display screen and the touch screen, except for interruption due to physical components of the electronic device, such as a border around the touch screen. For example, in the case where the touch screen and the display screen together show a graphical representation of water, an input on the touch screen may form the epicenter of a graphical representation of a ripple in the water. The ripple may begin on the touch screen, and continue onto the display screen. The changes may vary based on characteristics of the input. For example, one or more of the force, frequency, location, size, direction, and duration of the input may determine how the images change.

In some embodiments, the display table may also provide a tactile and/or audial output in response to the input. The tactile and/or audial output may vary based on characteristics of the input. For example, one or more of the force, frequency, location, size, direction, and duration of the input may determine the type of tactile and/or audial output that occurs in response to the input. The characteristics of the input that determine how the images change may be the same as or different than the characteristics of the input that determine the type of tactile and/or audial output.

In some embodiments, the electronic device and the display screen may be operably connected by a cable. The cable may pass through a hole in a transparent cover of the display table that overlays the display screen. The cable may extend between the transparent cover and the display screen and may be transparent to minimize blocking the image on the display screen.

These and other embodiments are discussed below with reference to the figures. However, those skilled in the art will readily appreciate that the detailed description given herein with respect to these figures is for explanatory purposes only and should not be construed as limiting.

Figure 1:
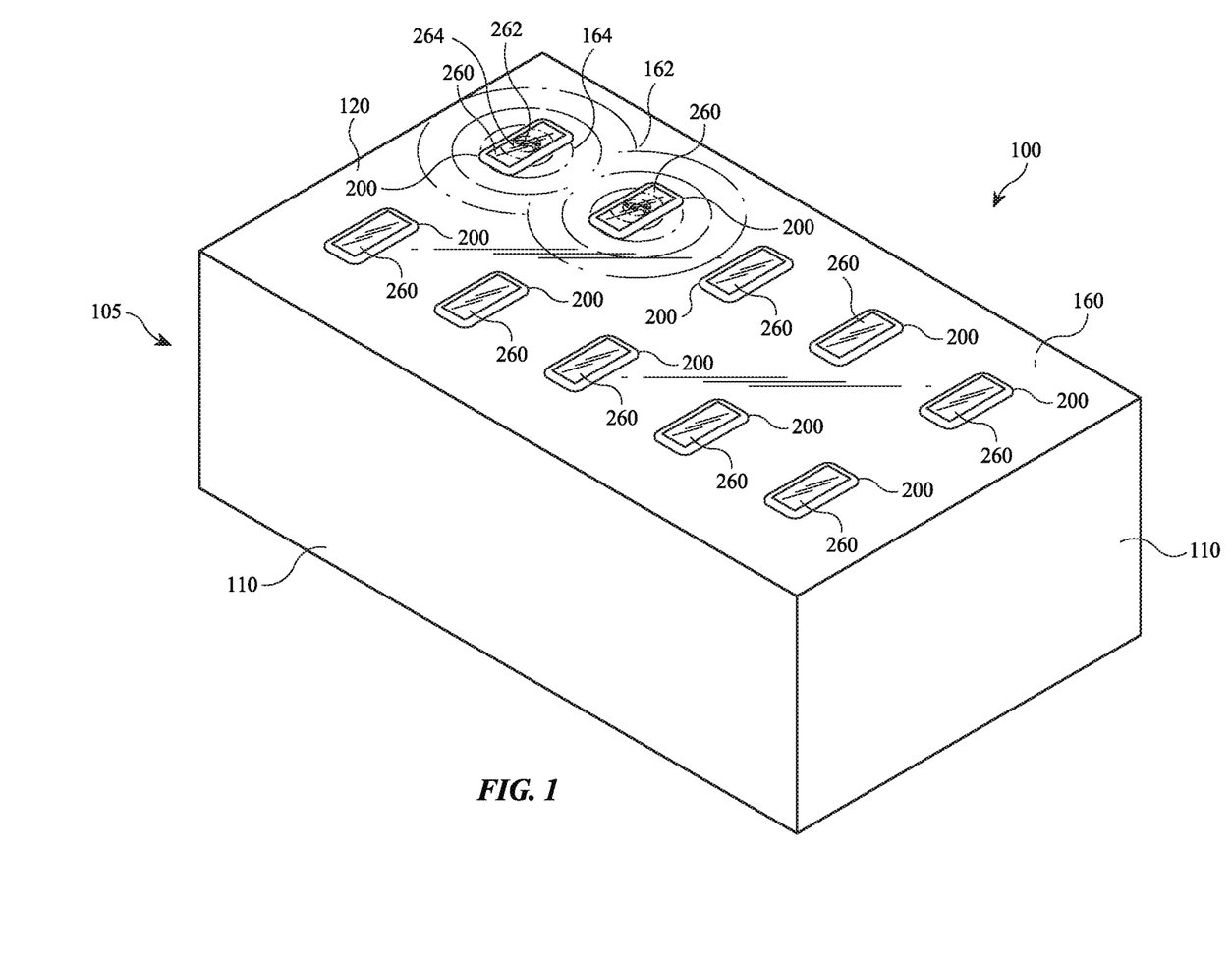
FIG. 1 shows a top perspective view of a display table according to some embodiments.
Figure 2:
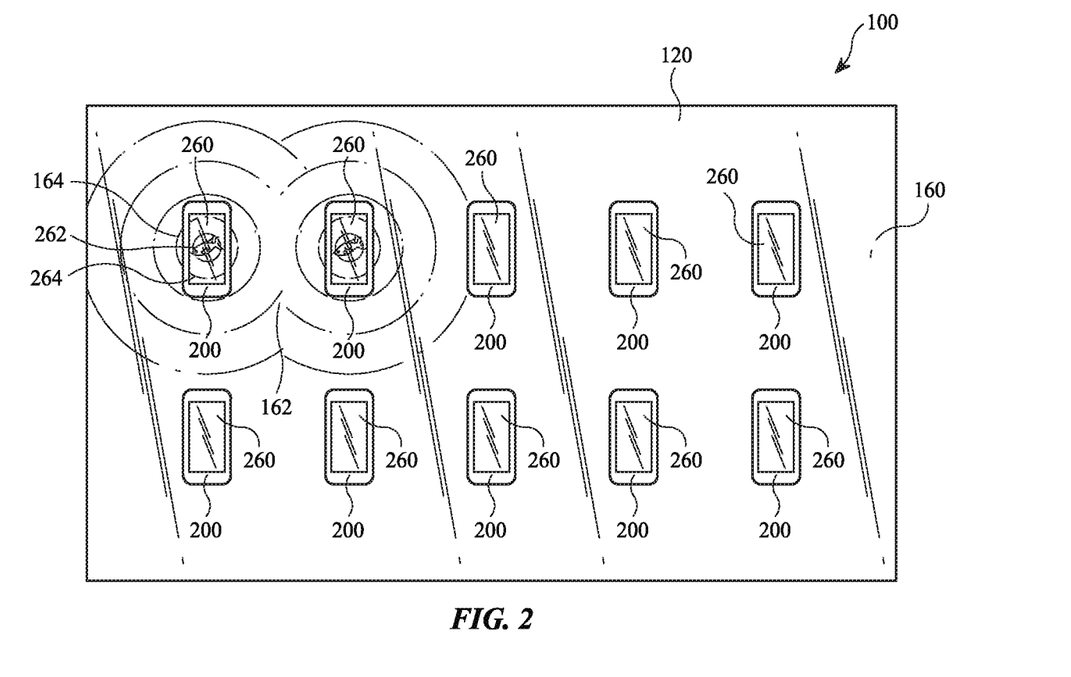
FIG. 2 shows a top view of a display table according to some embodiments.
Figure 3:
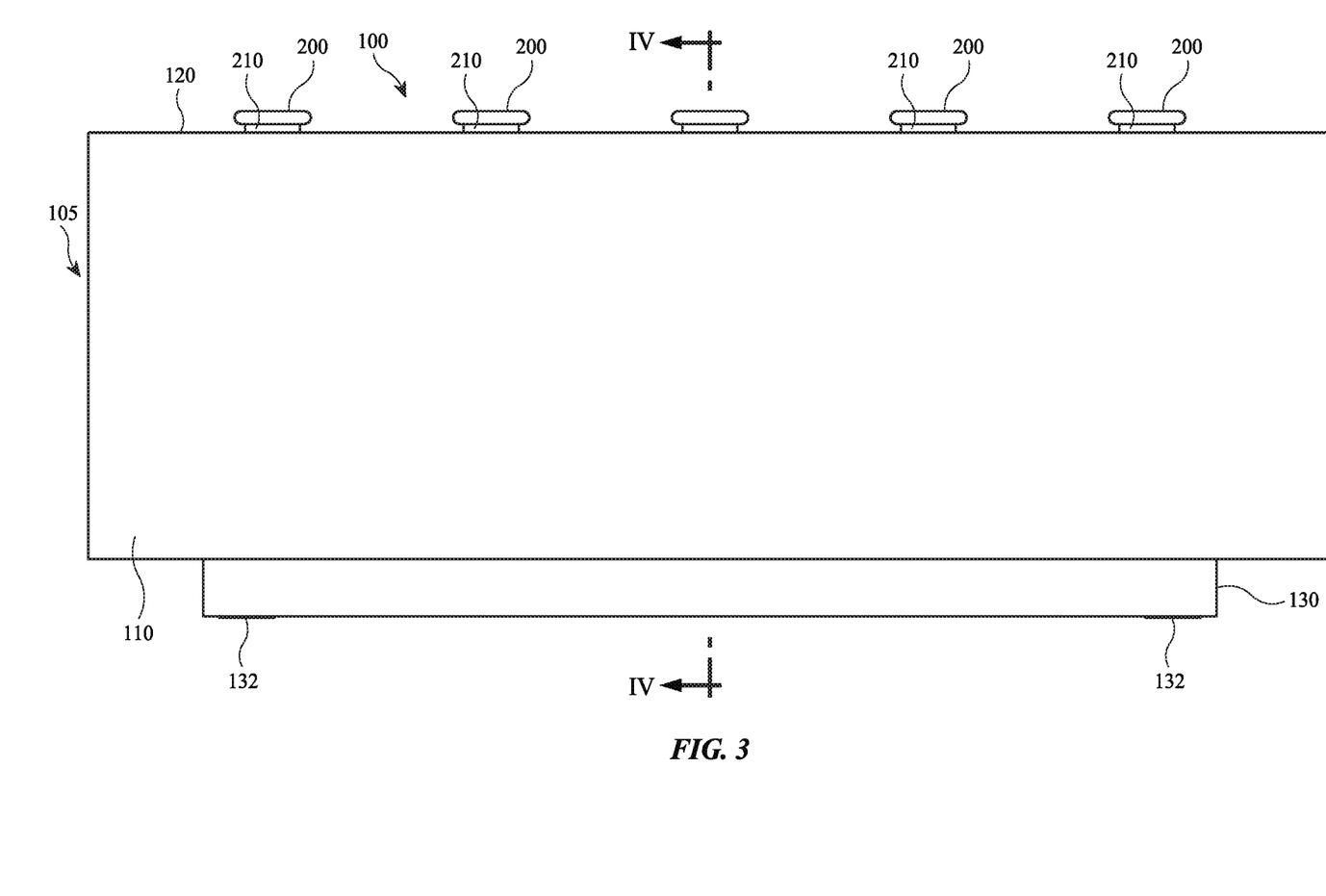
FIG. 3 shows a side view of a display table according to some embodiments.
Figure 4:
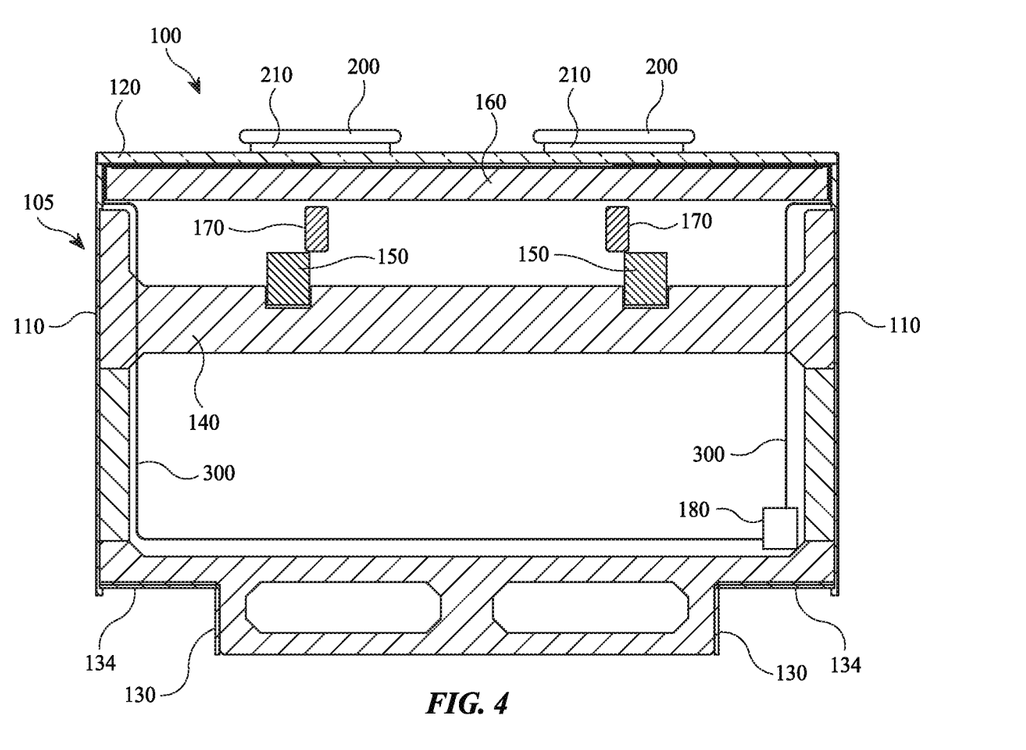
FIG. 4 shows a cross-section view of the display table of FIG. 3 along line IV-IV according to some embodiments.

A display table 100 according to some embodiments may present one or more electronic devices 200, as shown, for example, in FIGS. 1-4. In some embodiments, for example, display table 100 may present two, four, six, eight, ten, or more electronic devices 200. While FIGS. 1 and 2 show ten electronic devices 200, in some embodiments, display table 100 may support more or fewer than ten electronic devices 200. Electronic device 200 may be, but is not limited to, a smart phone, tablet, portable media device, or laptop.

According to some embodiments, display table 100 includes a support structure 105, a display screen 160, and a transparent cover 120. In some embodiments, support structure 105 elevates display screen 160 and transparent cover 120 to be at least two feet above the floor. In some embodiments support structure 105 includes side panels 110 that enclose a lower table structure. In other embodiments, support structure may include a typical table with a horizontal frame or platform supported by four legs. Other suitable structure for supporting a table may also be used in some embodiments.

Side panels 110, according to some embodiments, may form outer panels of display table 100. In some embodiments, display table 100 comprises four side panels 110. In some embodiments, four side panels 110 form a rectangular prism. Thus, two side panels 110 may be longer than two other side panels 110. In some embodiments, side panels 110 enclose other parts of support structure 105 and/or circuitry within display table 100 to conceal them from a consumer's view. In some embodiments, side panels 110 are disposed immediately adjacent to outer edges of display screen 160 (see FIG. 4). In some embodiments, side panels 110 are disposed less than 1 inch from outer edges of display screen 160. In such embodiments, display screen 160 and transparent cover 120 may appear to form substantially the entirety of an upper surface of display table 100 (e.g., greater than 90% of the upper horizontal surface (e.g., the surface within side panels 110)).

In some embodiments, display screen 160 may have a length and a width that is slightly less than a length and a width of the rectangular prism formed by side panels 110. Thus, display screen may be configured to fit within the space bordered by side panels 110. In some embodiments, display screen 160 may be a 98-inch display screen (i.e., a diagonal of the display screen is 98 inches) with a 16:9 aspect ratio. Other sizes or aspect ratios of display screens may also be used. For example, display screen 160 may be, but is not limited to, an 84-inch, a 79-inch, or a 65-inch display screen (i.e., a diagonal of the display screen is 84, 79, or 65 inches). Other aspect ratios may also be used. For example, display screen 160 may have, but is not limited to, an aspect ratio of 4:3 or 21:9. In some embodiments, display screen 160 may be a liquid crystal display screen. Other types of display screens may be used. For example, display screen 160 may be, but is not limited to, a cathode ray tube display screen, a light-emitting diode display screen, an organic light-emitting diode display screen, an electroluminescent display screen, or a plasma display panel.

Transparent cover 120, in some embodiments, overlays display screen 160. In some embodiments, transparent cover 120 is supported by side panels 110 (e.g., on a top edge thereof, see FIG. 4). In some embodiments, display screen 160 is visible through transparent cover 120. In some embodiments, transparent cover 120 forms a top surface of display table 100. In some embodiments, transparent cover 120 is formed of glass. In some embodiments, transparent cover 120 is formed of plastic. In some embodiments, transparent cover 120 has a hole 125 therethrough. In some embodiments, an electronic device 200 is disposed over hole 125. In some embodiments, transparent cover 120 has multiple holes 125. For example, transparent cover 120 may have two, four, six, eight, ten, or more holes 125. An electronic device 200 may be disposed over each hole 125.

Figure 5:
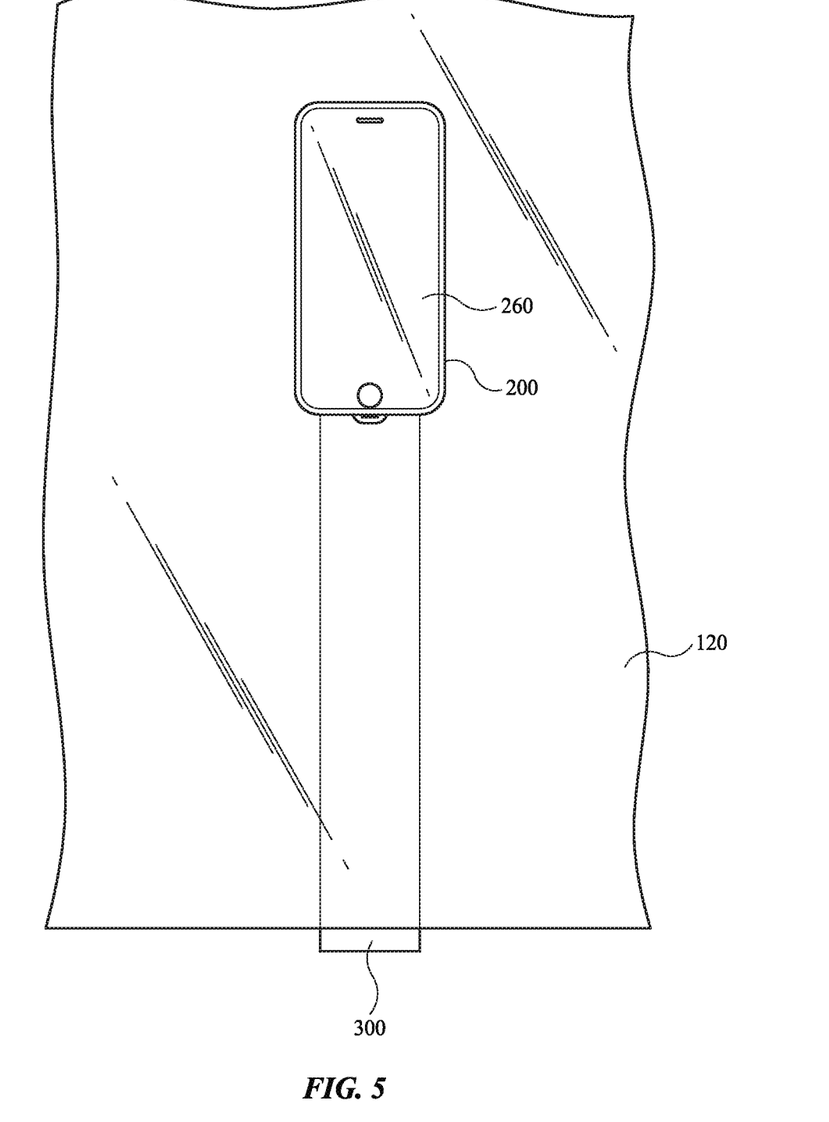
FIG. 5 shows a top view of an electronic device on a display table according to some embodiments.

In some embodiments electronic devices 200 disposed on display table 100 may be operably connected to a hub 180. In some embodiments, electronic devices 200 are connected to hub 180 via a cable 300, as shown, for example, in FIG. 5. In some embodiments, hub 180 is disposed within display table 100 surrounded by side panels 110 (see, e.g., FIG. 4). In other embodiments, hub 180 may be located in other places. For example, hub 180 may be located remotely from display table 100. Hub 180, according to some embodiments, operably connects to display screen 160. In some embodiments, hub 180 controls display screen 160. Hub 180 may control display screen 160 based at least in part on one or more signals received from electronic devices 200. In some embodiments, hub 180 includes a processor. In some embodiments, hub 180 is a computer (e.g., a desktop or laptop computer).

In some embodiments, electronic device 200 and display screen 160 may interact (e.g., to provide an immersive experience using electronic device 200 on the background of display screen 160, to provide related content between electronic device 200 and display screen 160, or to showcase features of electronic device 200, such as a 3D touch feature of electronic device 200).

In some embodiments, electronic device 200 comprises a touch screen 260 (i.e., a display screen that displays a visual output and accepts input through contact). In some embodiments, touch screen 260 displays an image. In some embodiments, touch screen 260 displays a moving image. In some embodiments, display screen 160 is not a touch screen. In some embodiments, display screen 160 displays an image. In some embodiments, display screen 160 displays a moving image. In some embodiments, the display screen image corresponds to the touch screen image. For example, the touch screen image may show what the display screen image would show at the location of electronic device 200 if electronic device 200 was not disposed at that location. Thus, in some embodiments, the display screen image comprises a continuation of the touch screen image. For example, in some embodiments, the touch screen image and the display screen image together comprise an image of water, such as a pond surface.

In some embodiments, the touch screen image changes in response to an input to the touch screen 260. In some embodiments, the change in the touch screen image depends on characteristics of the input. Thus, the change in the touch screen image may be different based on the characteristics of the input. In some embodiments, the characteristics of the input may include, for example, force, frequency, location, size, direction, or duration of the input. In some embodiments the touch screen image is not a representation of input controls, such as buttons, dials, text boxes or the like.

Figure 6:
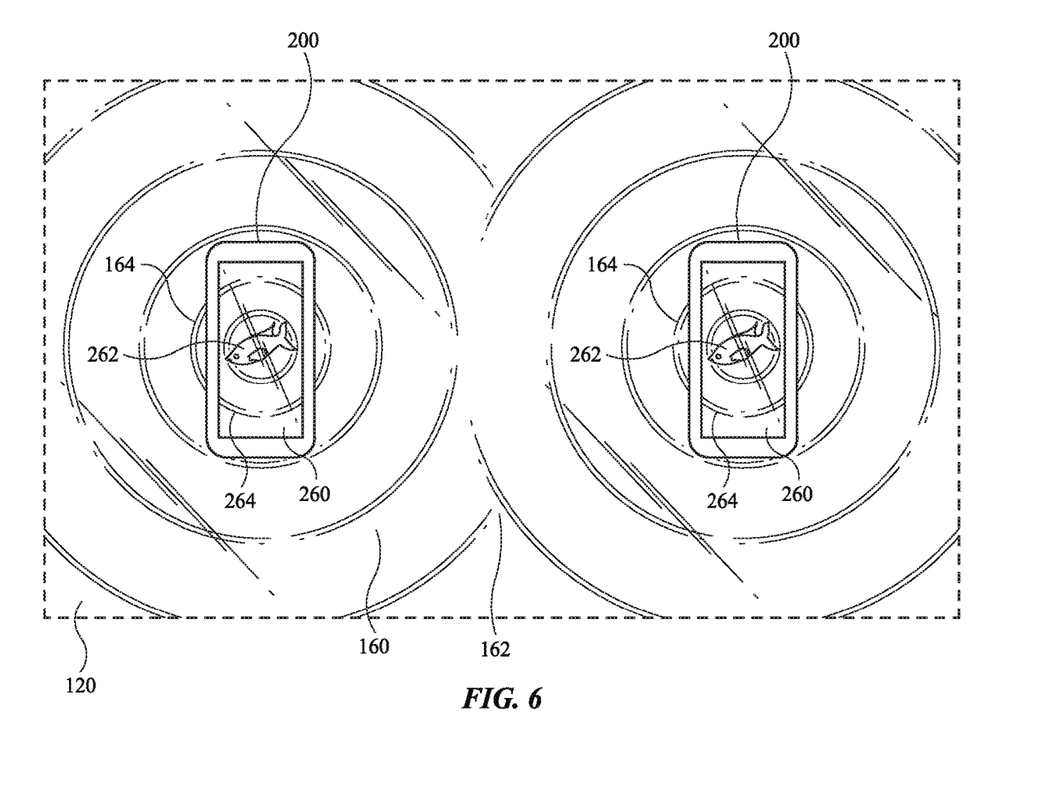
FIG. 6 shows a top view of a display table according to some embodiments.

As shown in FIG. 6, for example, in some embodiments, the touch screen image comprises an image of an object 262 (e.g., a fish). In some embodiments, absent an input, object 262 is stationary. In response to an input to the touch screen 260, the image of object 262 may move. In other embodiments, object 262 may appear to move even without an input. For example, object 262 may appear to move at a speed X without any input to touch screen 260. In some embodiments, an input of a short duration with a minimal force, such as a tap, may increase the speed of object 262 to 2X. In some embodiments, an input of longer duration of varying forces may increase the speed of object 262 to a speed within the range of 2X-9X. In some embodiments, an input of short duration with great force may increase the speed of object 262 to a speed of up to 14X. While FIG. 6 shows object 262 as a fish, any other object 262 may be used, including, but not limited to, animals, vehicles, balls, or other moving objects. In addition, multiple objects 262 may be displayed and similarly interacted with.

In some embodiments, an input to touch screen 260 may create other visual effects in addition to or instead of the effects related to object 262. In some embodiments, an input to touch screen 260 may create a moving graphical element 264, such as, but not limited to, ripples. For example, a tap may create a moving graphical element 264 originating from the location of the input. In some embodiments, a size of moving graphical element 264 may vary based on a characteristic of the input. For example, an input of greater force may create a bigger moving graphical element 264 than an input of relatively lesser force. In addition, an input of greater force may create additional images, such as the appearance of water drops hitting a water surface, along with moving graphical element 264.

In some embodiments, the display screen image may also change in response to the input to touch screen 260. In some embodiments, the change in the display screen image depends on characteristics of the input. Thus, the change in the display screen image may be different based on the characteristics of the input. In some embodiments, the characteristics of the input may include, for example, force, frequency, location, size, direction, or duration of the input. For example, in some embodiments, moving graphical element 264 on touch screen 260 may appear to continue onto display screen 160. Thus, in some embodiments, the input that created moving graphical element 264 on touch screen 260 also creates moving graphical element 164 on display screen 160. The change in the display screen image may comprise a graphical continuation of the change in the touch screen image.

In some embodiments, the display screen image may change in response to inputs to touch screens 260 from multiple electronic devices 200, as shown in FIG. 6. For example, moving graphical elements 264 may be created on multiple electronic devices 200, which may create multiple graphical elements 164 on display screen 160. In some embodiments, multiple graphical elements 164 may interact with each other on display screen 160 at intersection point 162. In some embodiments, a touch screen image from one electronic device 200 may change in response to an input to a touch screen 260 on a different electronic device 200. For example, as moving graphical element 164 on display screen 160 (created in response to an input on electronic device 200) approaches a second electronic device 200, the touch screen image on the second electronic device 200 may change to include a moving graphical element 264 on its display screen 260. Thus, the change in a touch screen image may also be a graphical continuation of the change in a display screen image.

While FIG. 6 shows moving graphical elements 264 and 164 as ripples, any other moving graphical element 264 and 164 may be used. For example, in some embodiments, moving graphical elements 264 and 164 comprise light patterns, lightning, bubbles, balloons, and so on.

Although only a few examples are given herein, the characteristics of force, frequency, location, size, direction, or duration may all be similarly used to affect the changes in the touch screen image and the display screen image. For example, moving graphical elements 264 and 164 may comprise ripples and, based on the direction of the input, may create the same visual effect as caused in water by skipping stones.

According to some embodiments, in addition to or instead of visual responses to an input, there may be tactile and/or audial responses. In some embodiments, electronic device 200 may vibrate in response to an input. The vibration may vary depending on a characteristic of the input. For example, the vibration may increase in intensity or duration as the force of the input increases. The vibration may also vary, for example, depending on the location, duration, or size of the input. In some embodiments, electronic device 200, or other portion of display table 100 may output a sound based on an input to touch screen 260. The sound may vary depending on a characteristic of the input. For example, the sound may be louder with an input of greater force. In some embodiments, the pitch of the sound may differ depending on the force of the input. Other qualities of the sound may also differ depending on one or more characteristics of the input, including force, location, duration, or size of the input.

Figure 7:
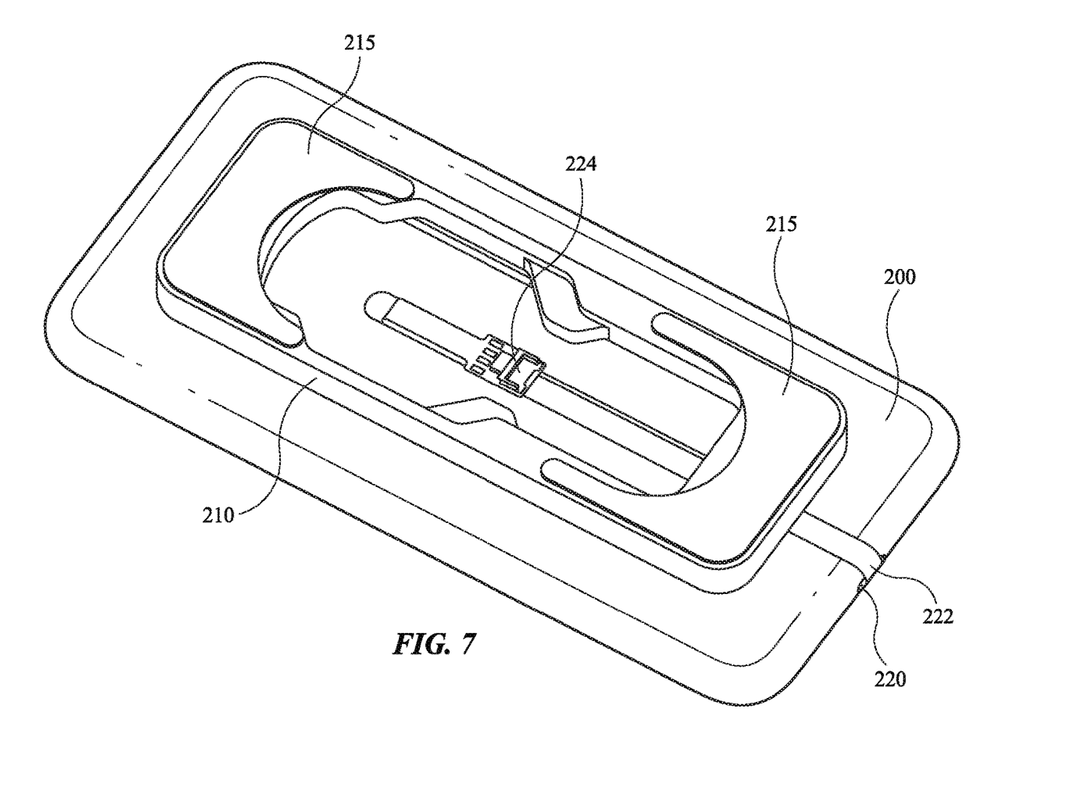
FIG. 7 shows a bottom perspective view of an electronic device for presenting on a display table according to some embodiments.
Figure 8:
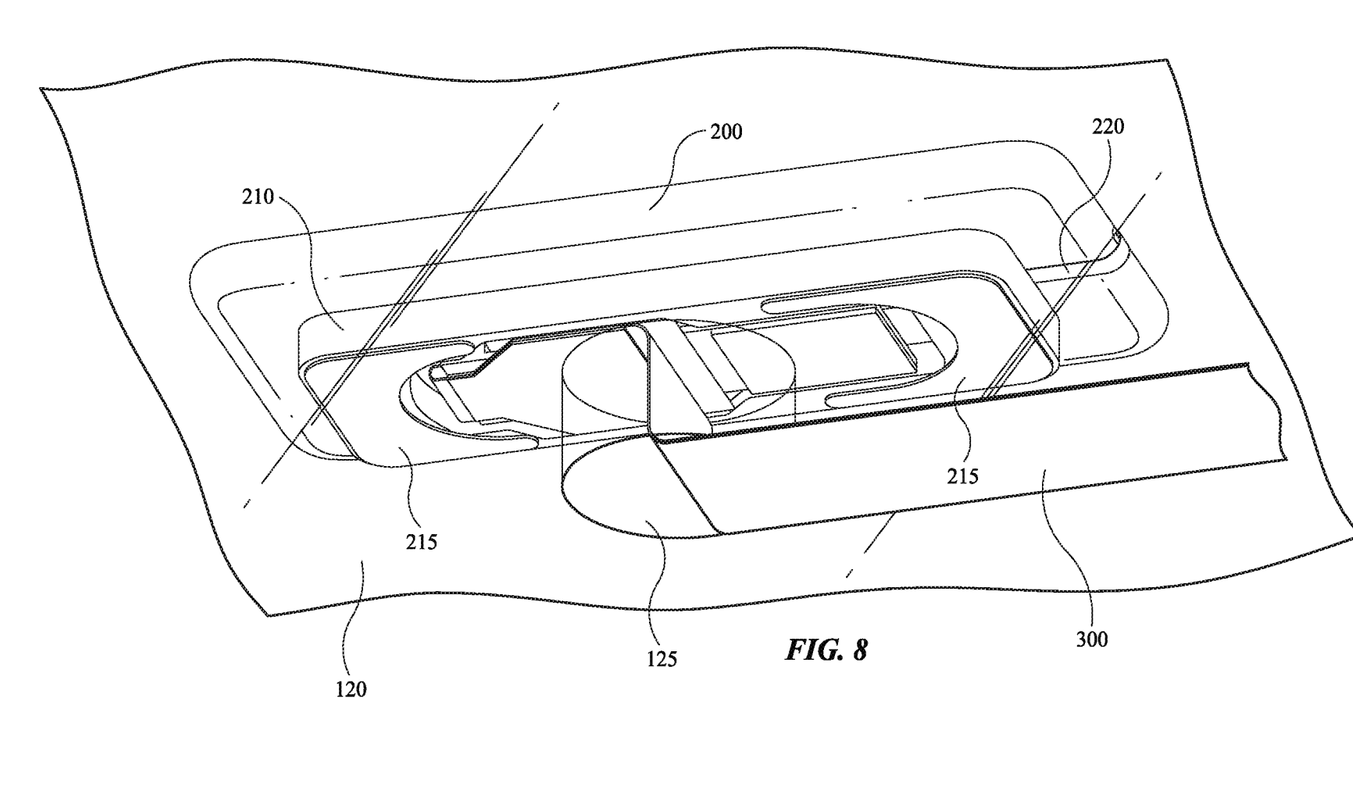
FIG. 8 shows a bottom perspective view of an electronic device on a display table according to some embodiments.
Figure 9:
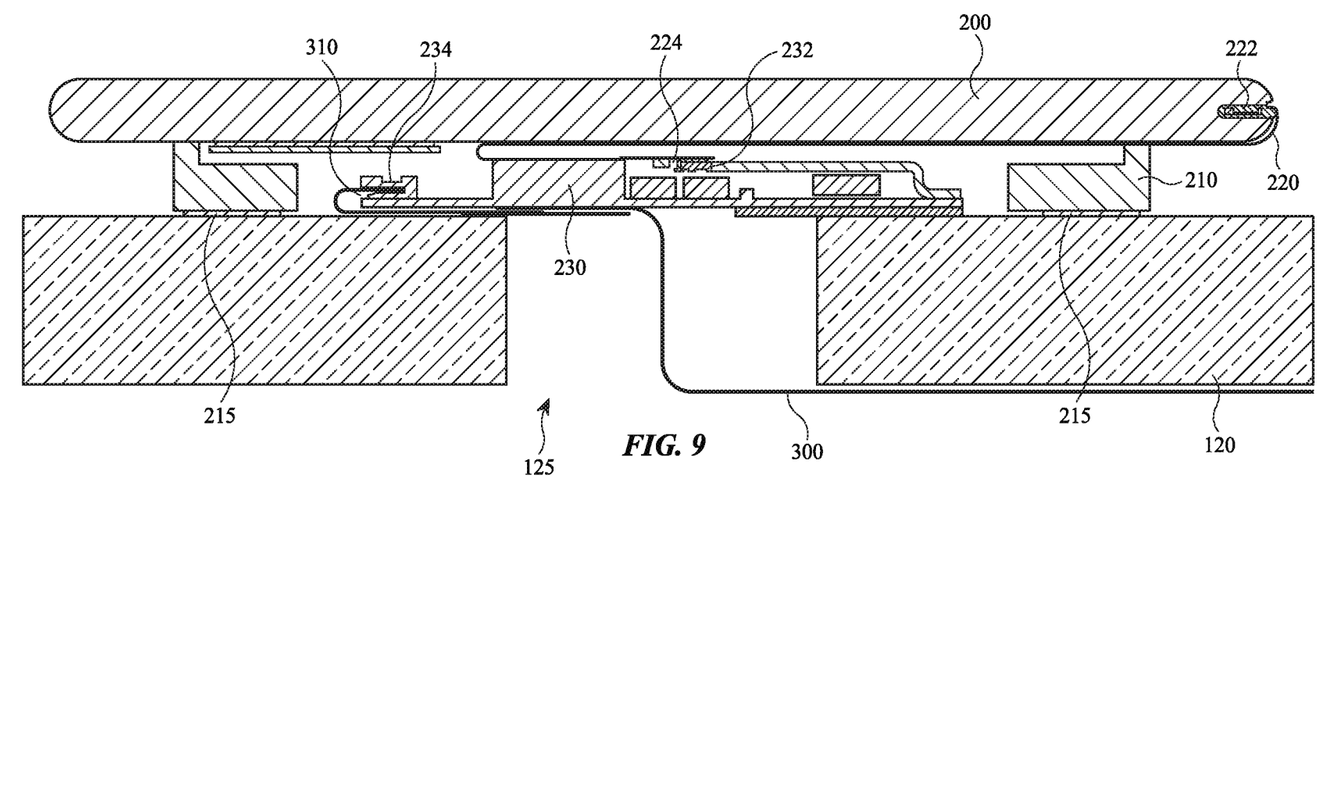
FIG. 9 shows a cross-section view of an electronic device on a display table according to some embodiments.

In some embodiments, a riser 210 is disposed on a back side of electronic device 200, as shown, for example, in FIGS. 7, 8, and 9. In some embodiments, riser 210 includes padding 215. In some embodiments, padding 215 of riser 210 provides a resilient, distributed connection between transparent cover 120 and riser 210.

Figure 10:
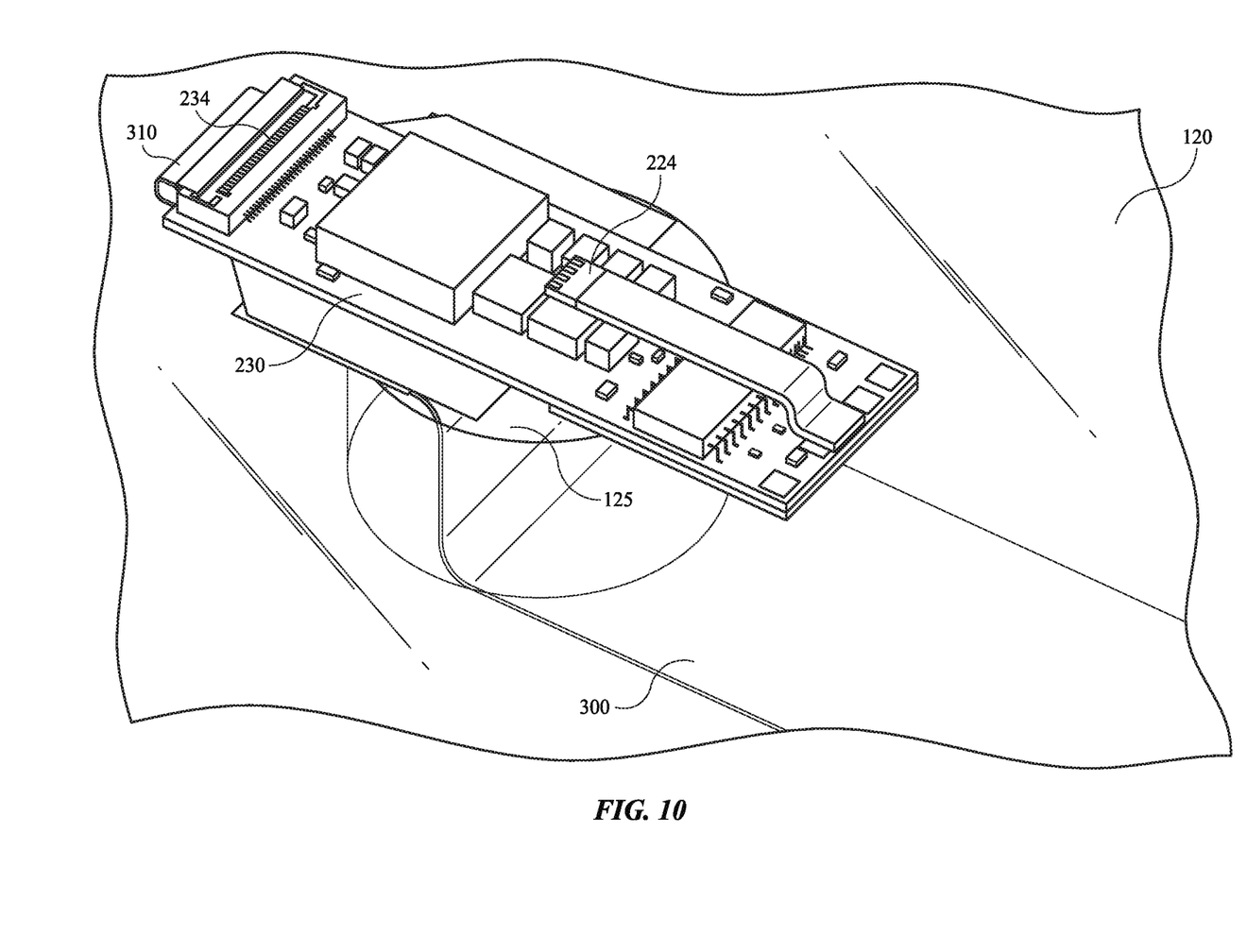
FIG. 10 shows a top perspective view of a circuit board on a display table according to some embodiments.

In some embodiments, riser 210 elevates electronic device 200 relative to transparent cover 120 and creates space for a printed circuit board 230. In some embodiments, printed circuit board 230 is disposed on the back side of electronic device 200. In some embodiments, printed circuit board 230 is disposed within riser 210. In some embodiments, printed circuit board 230 is disposed adjacently above transparent cover 120, as shown in FIGS. 9 and 10.

Printed circuit board 230, according to some embodiments, is connected to electronic device 200 with a flexible cable 220. In some embodiments, flexible cable 220 includes a first end 222 that connects to electronic device 200 and a second end 224 that connects to printed circuit board 230. In some embodiments, flexible cable 220, when connected to electronic device 200 and printed circuit board 230, conforms to a surface of electronic device 200, as shown in FIGS. 8 and 9, for example, so that only a small portion of flexible cable 220 is visible to avoid interfering with the visibility of display screen 160. In some embodiments, first end 222 comprises a connector that is configured to interface with a port in electronic device 200. In some embodiments, first end 222 comprises a connector that is configured to interface with a port of electronic device 200 that typically receives power and/or sends and receives data. In some embodiments, second end 224 comprises a universal serial bus connector. In some embodiments, second end 224 is configured to interface with a universal serial bus port 232 disposed on printed circuit board 230. In some embodiments, second end 224 is soldered directly to printed circuit board 230. Other electrical connections may also be used for the interface between flexible cable 220 and either electronic device 200 or printed circuit board 230.

Cable 300, according to some embodiments, provides power and data to electronic device 200. In some embodiments, printed circuit board 230 comprises an interface 234 with cable 300. In some embodiments cable 300 comprises a circuit board interface 310 configured to connect to interface 234 of printed circuit board 230. In some embodiments, cable 300 provides for two-way communication between electronic device 200 and hub 180. In some embodiments, cable 300 comprises miniature wires, such as microwires having a diameter in the range of 1 to 200 micrometers. For example, cable 300 may comprise miniature wires having a diameter that is less than 200 micrometers, less than 150 micrometers, less than 100 micrometers, or less than 50 micrometers. According to some embodiments, printed circuit board 230 modifies a signal from electronic device 200 so that it may be sent over the miniature wires of cable 300. In some embodiments, printed circuit board 230 is configured to convert the voltage of a signal from a higher voltage to a lower voltage and/or from a lower voltage to a higher voltage. For example, printed circuit board 230 may convert the voltage from 120, 60, 48, or 36 volts to 24, 12, 5, or 1.5 volts, or vice versa.

Figure 11:
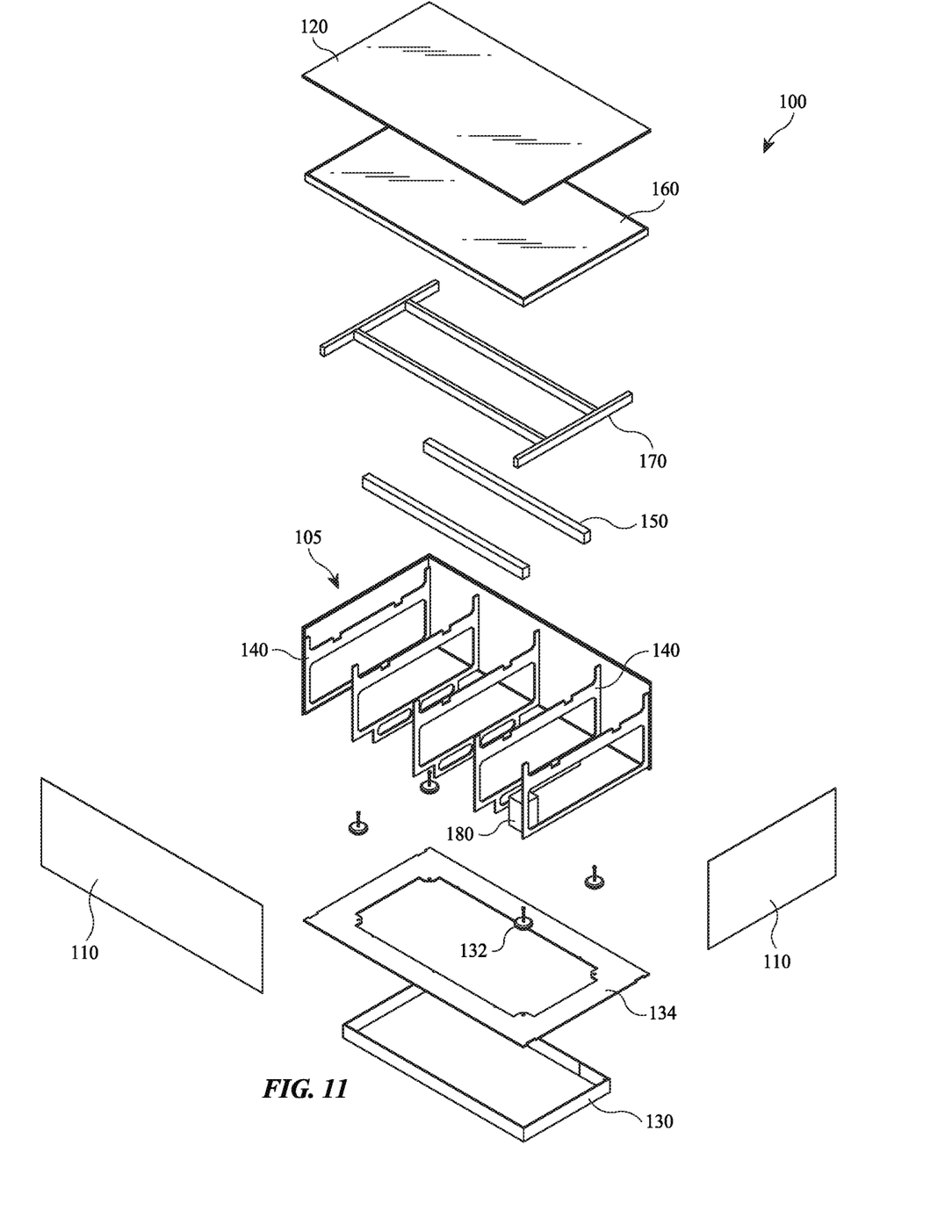
FIG. 11 shows an exploded view of a display table according to some embodiments.

In some embodiments, cable 300 is transparent. In some embodiments, only a portion of cable 300 is transparent (e.g., any portion that could otherwise be visible through transparent cover 120). In some embodiments, cable 300 extends from printed circuit board 230, through hole 125 of transparent cover 120, between display screen 160 and transparent cover 120, and around an edge of display screen 160 into display table 100 to hub 180. In some embodiments, cable 300, while passing over display screen 160, does not interfere with the visibility of display screen 160 to consumers. In some embodiments, cable 300 is adhered to a bottom surface of transparent cover 120. In some embodiments, as illustrated in FIG. 11, in addition to side panels 110, support structure 105 includes base 130, ribs 140, rails 150, and display cart 170. Base 130, according to some embodiments, may form a bottom portion of support structure 105. According to some embodiments, base 130 is shaped like a rectangular prism. In some embodiments, base 130 has smaller dimensions than the rectangular prism formed by side panels 110. In some embodiments, base 130 is raised slightly from the floor by legs 132. In some embodiments, display table 100 comprises four legs 132. In some embodiments, side panels 110 are disposed above base 130. According to some embodiments, base cover 134 connects side panels 110 with base 130.

In some embodiments, ribs 140 are disposed within side panels 110. In some embodiments, two, four, six, eight, or more ribs 140 are disposed within side panels 110. According to some embodiments, each rib 140 is spaced equally apart. In some embodiments, ribs 140 are attached to side panels 110. In some embodiments, ribs 140 are attached to base 130. According to some embodiments, ribs 140 accommodate rails 150, as shown, for example, in FIG. 4.

Figure 12:
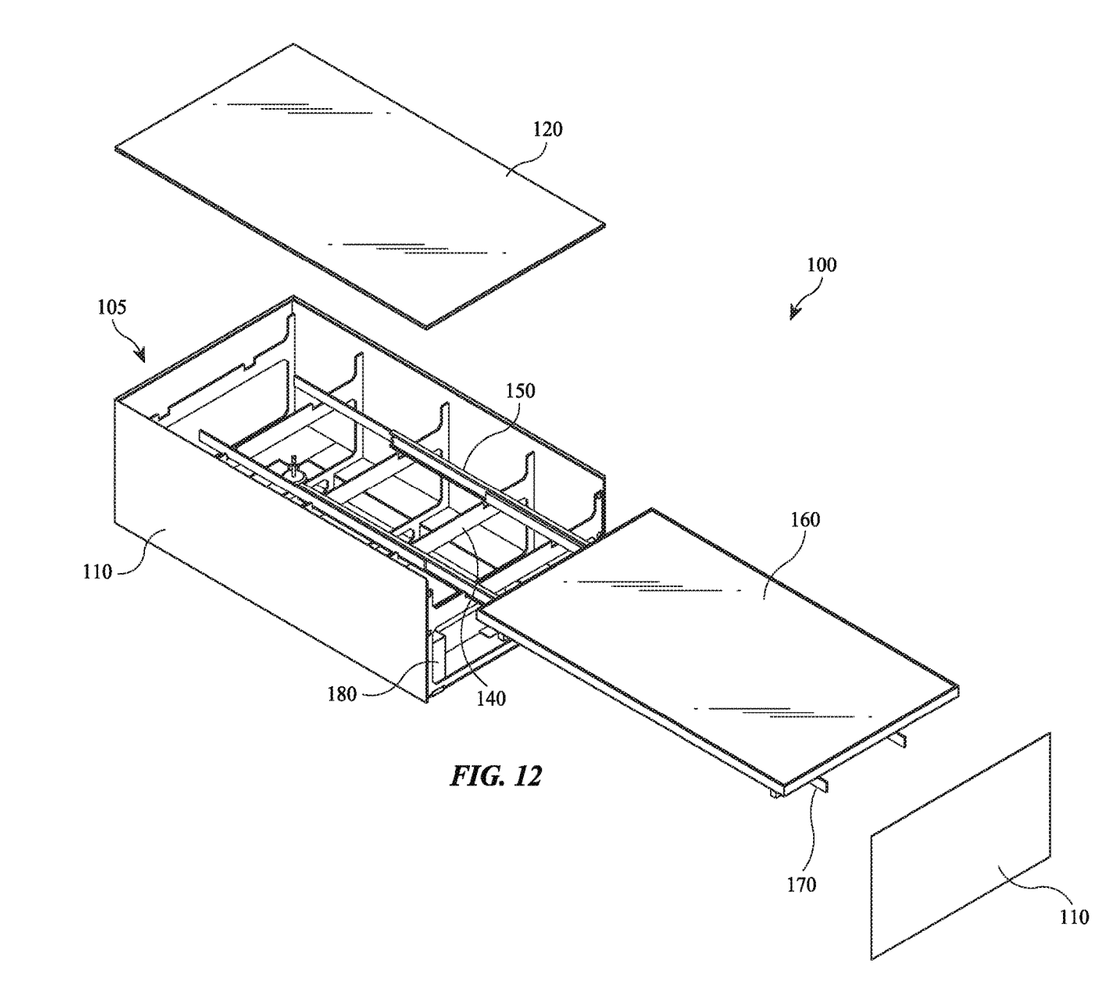
FIG. 12 shows a partially exploded view of a display table according to some embodiments.

Rails 150, according to some embodiments, may be telescoping rails. In some embodiments, rails 150 are extendible from a first configuration of a first length to a second configuration of a second length. In some embodiments, display cart 170 is disposed on rails 150. Display cart 170 may be configured to support display screen 160. In some embodiments, rails 150 may be used to move display screen 160 from a closed position to an open position, as shown, for example, in FIG. 12. FIG. 12 shows display table 100 in a partially exploded view (transparent cover 120 is exploded up) with display screen 160 in an open position. Thus, in some embodiments, display screen 160 may be moved into the open position for maintenance or replacement of display screen 160, or other parts or circuitry disposed within display table 100, without removing transparent cover 120. Upon completion of maintenance or replacement, display screen 160 may be returned to the closed position.

The foregoing descriptions of the specific embodiments described herein are presented for purposes of illustration and description. These exemplary embodiments are not intended to be exhaustive or to limit the embodiments to the precise forms disclosed. All specific details described are not required in order to practice the described embodiments.

It will be apparent to one of ordinary skill in the art that many modifications and variations are possible in view of the above teachings, and that by applying knowledge within the skill of the art, one may readily modify and/or adapt for various applications such specific embodiments, without undue experimentation, without departing from the general concept of the present invention. Such adaptations and modifications are intended to be within the meaning and range of equivalents of the disclosed embodiments, based on the teaching and guidance presented herein. For example, in some embodiments, electronic device 200 may wirelessly connect to hub 180. In some embodiments, electronic device 200 is not limited to a location of hole 125. Thus, display table 100 and/or electronic device 200 may be equipped with position sensors. The position sensors may determine where electronic device 200 is located relative to display screen 160 and communicate the position of electronic device 200 to hub 180. Based on this determination, hub 180 may determine where an input to touch screen 260 is located relative to display screen 160. Hub 180 may communicate with electronic device 200 and/or display screen 160 to ensure that the touch screen image and the display screen image correspond appropriately.

The detailed description section is intended to be used to interpret the claims. The summary and abstract sections may set forth one or more but not all exemplary embodiments of the present invention as contemplated by the inventor(s), and thus, are not intended to limit the present invention and the claims.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The phraseology or terminology used herein is for the purpose of description and not limitation, such that the terminology or phraseology of the present specification is to be interpreted by the skilled artisan.

The breadth and scope of the present invention should not be limited by any of the above-described exemplary embodiments, but should be defined in accordance with the claims and their equivalents.

What is claimed is:

1. A system for providing related content between two electronic devices, the system comprising:
    a first display screen displaying a first moving image; and
    a second display screen displaying a second moving image, wherein the second display screen is disposed over the first display screen,
    wherein, in response to an input, graphical elements of the second moving image appear to move continuously over an edge of the second display screen and on to the first display screen to become part of the first moving image.

2. The system of claim 1, wherein the second display screen is parallel to the first display screen and facing in the same direction as the first display screen, and wherein the second display screen overlaps the first display screen from a perspective normal to the first display screen.

3. The system of claim 1, wherein the graphical elements are created by the input, and wherein a parameter of the graphical elements' movement from the second display screen to the first display screen depends on a characteristic of the input.

4. The system of claim 3, wherein the parameter of the graphical elements' movement is at least one of speed or size, and wherein the input characteristic is at least one of force, frequency, location, size, direction, or duration.

5. The system of claim 1, wherein the second display screen is a touch screen, and wherein the input is a touch on the touch screen.

6. The system of claim 1, wherein the second display screen is smaller than the first display screen.

7. The system of claim 1, wherein a display area of the first display screen is greater than 10 times a display area of the second display screen.

8. The system of claim 1, comprising a handheld electronic device comprising the second display screen.

9. The system of claim 8, wherein a rear surface of the handheld electronic device is in contact with the first display screen.

10. The system of claim 8, wherein the graphical elements appear to move from the second display screen to the first display screen without visual interruption except from physical components of the handheld electronic device.

11. A display device for extending content of another device, the display device comprising a display screen displaying a first moving image,
    wherein the first moving image of the display screen changes in response to an input received via an electronic device in communication with the display device, and
    wherein, in response to the input, graphical elements of a second moving image displayed on the electronic device appear to move continuously from the electronic device and on to the display screen to become part of the first moving image.

12. The display device of claim 11, wherein a parameter of the graphical elements' movement from the electronic device to the display screen is influenced by at least one of force, frequency, location, size, direction, or duration of the input.

13. The display device of claim 11, wherein the display device is wirelessly connected to the electronic device.

14. The display device of claim 11, wherein the appearance of the graphical elements' movement from the electronic device to the display screen depends on a position of the electronic device relative to the display device.

15. The display device of claim 11, wherein the first moving image and the second moving image, when viewed together, appear to form a continuous moving image.

16. A method for providing related content between two electronic devices, the method comprising:

displaying, on a first display screen, a first moving image;
changing the first moving image to appear to incorporate graphical elements from a second moving image of a second display screen into the first moving image, wherein the graphical elements appear to move continuously from the second display screen and on to the first display screen to become part of the first moving image.

17. The method of claim 16, further comprising:
receiving, at a first electronic device comprising the first display screen, an input from a second electronic device comprising the second display screen,
wherein the appearance of the graphical elements' movement from the second display screen to the first display screen is influenced by the input.

18. The method of claim 17, wherein speed of the graphical elements' movement from the second display screen to the first display screen depends on at least one of force, frequency, location, size, direction, or duration of the input.

19. The method of claim 17, wherein size of the graphical elements depends on at least one of force, frequency, location, size, direction, or duration of the input.

20. The method of claim 16, wherein the first display screen and the second display screen, when viewed together, appear to form a continuous moving image.

* * * * *